March 3, 1931.   H. L. GORDON   1,794,955
FLANGE
Filed Feb. 28, 1929

Inventor
Herman L. Gordon
by James R. Hodges
Attorney

Patented Mar. 3, 1931

1,794,955

UNITED STATES PATENT OFFICE

HERMAN L. GORDON, OF BOSTON, MASSACHUSETTS, ASSIGNOR OF ONE-HALF TO CHARLES WENNETT, OF BOSTON, MASSACHUSETTS

FLANGE

Application filed February 28, 1929. Serial No. 343,475.

My present invention relates to flanges, and more particularly to an improved repair flange for automobile or the like exhaust pipes.

A frequent source of trouble in automobiles or other motor vehicles occurs at the junction of the exhaust manifold with the exhaust pipe leading to the silencer or muffler. The hot gases passing from the exhaust manifold into the pipe exert a corroding effect thereon and as the majority of such pipes have a flared end and are attached to the end of the exhaust manifold by means of a coupling nut, the exhaust gases filter through the space between the front flanged end of the pipe and the coupling nut and find their way up into the automobile body. Heretofore the only way in which this condition could be remedied was by installing a new exhaust pipe which not only was relatively expensive from the standpoint of cost of the exhaust pipe itself, but expensive from the standpoint of the labor involved in removing the old pipe and installing the new one.

In my present invention I have obviated the objections above noted and have produced an improved flange or repair coupling which may be used in conjunction with the flared end of the usual exhaust pipe and by means of which a tight joint may be made by means of the coupling nut between the repair flange and the end of the exhaust manifold.

An object of my invention, therefore, is an improved repair flange for automobile exhaust pipes and the like.

A further object of my invention is an improved device for connecting an exhaust pipe to an exhaust manifold.

In the accompanying drawings illustrating the preferred embodiment of my invention, Fig. 1 is a side elevation showing the invention attached to the exhaust manifold of an automobile;

Figure 1:
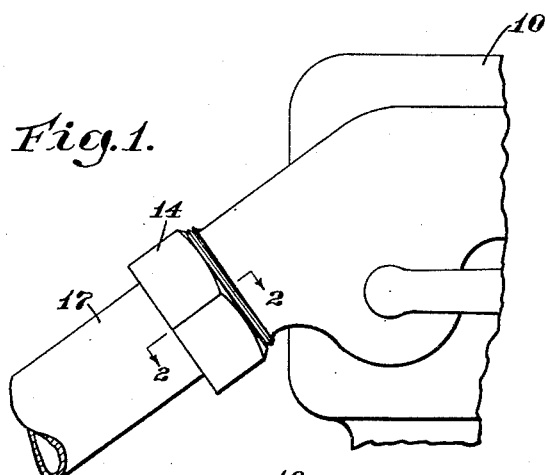
Figure 2:
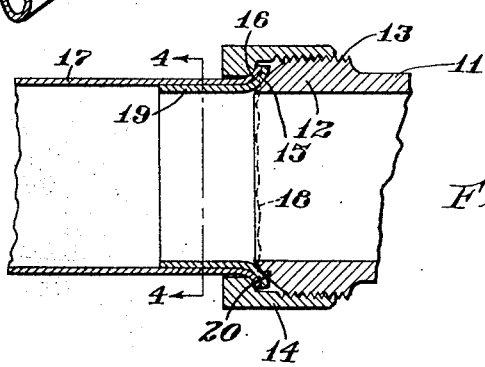
Fig. 2 is a section on the line 2—2 of Fig. 1.

Referring to the drawings, 10 designates the engine block of an automobile, in the present instance the block being that of the model T Ford automobile, and attached to such engine block is the exhaust manifold 11, provided at the exhaust end 12 with threads 13 to receive the internal threads on a coupling nut 14. The extreme end of the threaded end 12 is rounded or beveled, as shown at 15, so as to engage with a flared or beveled end 16 of the usual exhaust pipe 17, leading to a silencer or muffler (not shown). The flared end 16 of the exhaust pipe 17 becomes eaten away through corrosion or burning, as indicated by the numeral 18, and under such circumstances it is impossible to provide a tight joint between the flared end 16 and the rounded or beveled end 15 by means of the coupling nut 14, and consequently the exhaust gases passing from the exhaust manifold 11 find their way outward between the flared end 16 or the beveled end 15 and into the automobile in which the device is installed.

Figure 3:
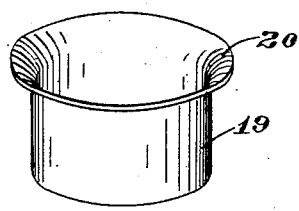
Fig. 3 is a perspective view of one form of my improved flange.

Referring to Fig. 3, 19 indicates a flange, the cylindrical portion of which is a sliding fit within the interior of the exhaust pipe 17, and one end thereof is flared outwardly, as indicated at 20, such flare being substantially identical with the flared end 16 on the exhaust pipe 17. Therefore, when the flared end 16 of the pipe 17 becomes corroded and eaten away, as at 18, so as to allow the spent gases to pass between the flared end 16 or rounded or beveled end 15, instead of through the pipe 17, one of the flanges 19 illustrated in Fig. 3 may be slipped into the open end of the pipe 17 with the flared end 20 thereof engaging with the flared end 16 and the coupling nut 14 again replaced in position on the threads 13 of the exhaust manifold 11, thus bringing a new element into play and insuring a tight joint between the flared end 20 and the rounded or beveled end 15 of the exhaust manifold 11, and as the flared end 20 engages with the flared end 16 of the pipe 17 throughout practically its entire area, there is made a tight joint between such flange 20 and the flared end 16, with the result that gases are prevented from passing from the exhaust manifold 11 other than entirely through the exhaust pipe 17.

Figure 4:
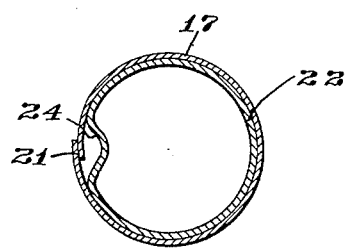
Fig. 4 is a view on the line 4—4 of Fig. 2, it being assumed that the flange is a modified form of that illustrated in Fig. 3.
Figure 5:
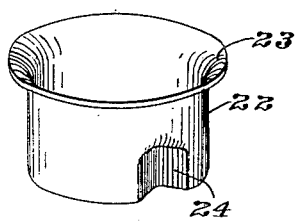
Fig. 5 is a perspective view of the flange referred to in Fig. 4.

The exhaust pipe 17, particularly in a model T Ford, is ordinarily made of iron or steel and is what is known as butt weld. It may happen, however, that such pipe is what is known as lap weld, as indicated in Fig. 4 by the numeral 21, and in such event the form of flange illustrated in Fig. 3 will not fit within the interior of such pipe 17. I have, therefore, devised the form of flange illustrated in Figs. 4 and 5 and designated by the numeral 22, such flange being provided at one end with a flared opening 23, similar to the flared opening 20 on the flange 19, and also in the body of the flange 22 is formed a depression 24, which allows ample room in which the lap weld portion 21 may fit. The flared end 23, however, will fit closely against the flared end 16 of the exhaust pipe 17, whether such pipe is of the lap weld or butt weld variety.

My invention, while particularly applicable to use on automobiles and in the situation above described, is capable of use in other situations which will readily suggest themselves to those skilled in the art. I do not, therefore, wish to limit myself other than as pointed out in the appended claims.

Having thus described my invention, what I claim as new is:

1. Means for repairing an exhaust pipe joint which has deteriorated by corrosion comprising an annulus of relatively soft metal having a flared open end, the body of said annulus adapted to be fitted into the interior of the exhaust pipe with the flared end of said annulus disposed between the open end of the exhaust pipe and the exhaust manifold outlet and adapted to be compressed therebetween by the usual pipe coupling, whereby a substantially gas tight connection is maintained between the open flared end of said exhaust pipe and said exhaust manifold outlet.

2. Means for repairing an exhaust pipe joint which has deteriorated by corrosion comprising an annulus of relatively soft metal having a flared open end, the body of said annulus adapted to be fitted into the interior of the exhaust pipe with the flared end of said annulus disposed between the open end of the exhaust pipe and the exhaust manifold outlet and adapted to be compressed therebetween by the usual pipe coupling, whereby a substantially gas tight connection is maintained between the open flared end of said exhaust pipe and said exhaust manifold outlet, and an inwardly extending indentation formed in the body of the annulus adjacent the end thereof opposite the flared end.

In testimony whereof, I have signed my name to this specification.

HERMAN L. GORDON.